US012590609B2

(12) United States Patent
Davis

(10) Patent No.: US 12,590,609 B2
(45) Date of Patent: *Mar. 31, 2026

(54) CLUTCH ASSEMBLY

(71) Applicant: Clutch Industries Pty Ltd, Coburg North (AU)

(72) Inventor: Brad Davis, Coburg North (AU)

(73) Assignee: Clutch Industries Pty Ltd. (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/017,981

(22) PCT Filed: Jul. 26, 2021

(86) PCT No.: PCT/AU2021/050805
§ 371 (c)(1),
(2) Date: Jan. 25, 2023

(87) PCT Pub. No.: WO2022/020880
PCT Pub. Date: Feb. 3, 2022

(65) Prior Publication Data
US 2023/0287938 A1 Sep. 14, 2023

(30) Foreign Application Priority Data

Jul. 27, 2020 (AU) ................................ 2020902617

(51) Int. Cl.
*F16D 13/68* (2006.01)
*F16D 1/10* (2006.01)
(Continued)

(52) U.S. Cl.
CPC .............. *F16D 13/58* (2013.01); *F16D 1/10* (2013.01); *F16D 13/38* (2013.01); *F16D 13/385* (2013.01);
(Continued)

(58) Field of Classification Search
CPC ............. F16D 13/644; F16D 13/38–58; F16D 2001/103
See application file for complete search history.

(56) References Cited

U.S. PATENT DOCUMENTS

| | | | |
|---|---|---|---|
| 1,577,901 | A | 3/1926 | Fawick |
| 1,665,554 | A | 4/1928 | Kolb |

(Continued)

FOREIGN PATENT DOCUMENTS

| | | |
|---|---|---|
| CN | 105840685 A | 8/2016 |
| CN | 111207156 A | 5/2020 |

(Continued)

OTHER PUBLICATIONS

International Search Report and Written Opinion for PCT/AU2021/050805 dated Jul. 26, 2021.

(Continued)

*Primary Examiner* — Ernesto A Suarez
*Assistant Examiner* — Lillian T Nguyen
(74) *Attorney, Agent, or Firm* — Womble Bond Dickinson (US) LLP

(57) ABSTRACT

A sealed clutch and a clutch plate, the sealed clutch including a spline connector for connecting the sealed clutch by splined connection to a transmission shaft of an automotive transmission. The spline connector comprising a connector housing and a spline ring. The spline ring including an opening having a spline configuration for cooperating with a splined portion of a transmission shaft. The connector housing being secured within the sealed clutch and the spline ring being removably connectable to the connector housing to enable the spline ring to be removed and replaced with a different spline ring for cooperating with a splined portion of a different transmission shaft. The clutch plate has a pair of drive plates having a coaxially aligned openings (Continued)

and a spline connector mounted between them. The outer diameter of the spline ring being slightly less than the inner diameter of the opening of one of the drive plates and a removable retainer being interposed between the spline connector and the drive plate to retain the spline ring, whereby removal of the removable retainer enables removal of the spline ring from the spline connector through the opening of the drive plate.

15 Claims, 8 Drawing Sheets

(51) Int. Cl.
| | |
|---|---|
| *F16D 13/38* | (2006.01) |
| *F16D 13/58* | (2006.01) |
| *F16D 13/64* | (2006.01) |
| *F16D 13/70* | (2006.01) |

(52) U.S. Cl.
CPC ........... *F16D 13/644* (2013.01); *F16D 13/68* (2013.01); *F16D 13/70* (2013.01); *F16D 2001/103* (2013.01)

(56) References Cited

U.S. PATENT DOCUMENTS

| | | | | |
|---|---|---|---|---|
| 2,181,797 | A | * | 11/1939 | Bateman ................. F16D 23/12 192/105 C |
| 2,276,416 | A | * | 3/1942 | Nutt ...................... F16D 13/646 192/214.1 |
| 3,129,570 | A | | 4/1964 | Ludwig |
| 3,465,860 | A | * | 9/1969 | Wayne ................. F16D 13/385 192/70.16 |
| 3,981,138 | A | | 9/1976 | Nosek |
| 4,057,131 | A | | 11/1977 | Flotow |
| 4,185,728 | A | | 1/1980 | Gatewood |
| 4,303,149 | A | * | 12/1981 | Lech, Jr. ................... F16D 1/08 464/182 |
| 4,352,420 | A | | 10/1982 | Maycock |
| 4,446,955 | A | | 5/1984 | Lech, Jr. |
| 4,461,376 | A | | 7/1984 | Lech, Jr. et al. |
| 4,601,676 | A | * | 7/1986 | Tojima .............. F16F 15/12346 192/208 |
| 4,692,053 | A | | 9/1987 | Sampedro |
| 4,815,189 | A | | 3/1989 | Ijames et al. |
| 4,941,557 | A | | 7/1990 | Flotow |
| 5,052,244 | A | * | 10/1991 | Kamiya ........... F16F 15/13446 192/205 |
| 5,333,712 | A | | 8/1994 | Sabee |
| 5,954,552 | A | | 9/1999 | Lauterbach |
| 6,557,687 | B1 | | 5/2003 | Herchick |
| 7,770,704 | B1 | | 8/2010 | Dumas |
| 8,096,885 | B2 | * | 1/2012 | MacDonald .......... F16F 15/123 29/446 |
| 9,097,292 | B2 | * | 8/2015 | Kang ...................... F16D 13/68 |
| 11,655,860 | B2 | * | 5/2023 | Davis ................... F16D 13/644 192/70.17 |
| 2004/0195067 | A1 | | 10/2004 | Friedrich et al. |
| 2005/0121282 | A1 | | 6/2005 | Fox |
| 2006/0260900 | A1 | | 11/2006 | Bassett |
| 2010/0130289 | A1 | | 5/2010 | Uehara et al. |
| 2012/0181134 | A1 | | 7/2012 | Roberts et al. |
| 2015/0240881 | A1 | | 8/2015 | Bibby |
| 2018/0073569 | A1 | | 3/2018 | Crespo et al. |
| 2022/0025934 | A1 | | 1/2022 | Davis |
| 2022/0025935 | A1 | | 1/2022 | Davis |
| 2022/0090634 | A1 | * | 3/2022 | Senoue ................... F16D 7/025 |

FOREIGN PATENT DOCUMENTS

| | | | | | |
|---|---|---|---|---|---|
| DE | 112015005923 | T5 | * | 9/2017 | ............. F16D 13/64 |
| KR | 20050020905 | A | * | 3/2005 | ........... F16D 13/644 |
| WO | WO-2018167440 | A1 | * | 9/2018 | .......... F16F 15/1238 |

OTHER PUBLICATIONS

RXT Twin Disc (retrieved from internet on Aug. 18, 2021) <url:https://web.archive.org/web/20120226163945/http://mcleodracing.com/products/RXT+Twin+Disc.mcl > published on Feb. 26, 2012 as per Wayback Machine Related to US 2012/0181134.

International Search Report and Written Opinion for PCT/AU2021/050804 dated Aug. 26, 2021.

International Search Report and Written Opinion for PCT/AU2021/050805 dated Sep. 24, 2021.

International Search Report and Written Opinion for PCT/AU2021/050806 dated Aug. 26, 2021.

Notice of Allowance and Fee(s) Due for U.S. Appl. No. 17/383,801, dated Jan. 18, 2023.

Amendment A and Response to Office Action for U.S. Appl. No. 17/383,801, dated Dec. 22, 2022.

Office Action for U.S. Appl. No. 17/383,801, dated Jun. 29, 2022.

* cited by examiner

CLUTCH ASSEMBLY

PRIORITY CROSS-REFERENCE

The present application is a national stage application, filed under 35 U.S.C. § 371 of International Patent Application No. PCT/AU2021/050805, filed 26 Jul. 2021, which claims priority from Australian Provisional Patent Application No. 2020902617 filed 27 Jul. 2020 the contents of which are to be considered to be incorporated into this specification by their reference.

TECHNICAL FIELD

The present invention relates to a clutch assembly for an automotive vehicle and more particularly to a clutch assembly that can be mounted within different drivetrains of different vehicles. The clutch assembly can thus be termed as a "universal" clutch assembly in that the clutch assembly of the present invention facilitates attachment of one form of clutch universally within vehicles that employ different drivetrain forms including different forms of transmission gear spline shafts.

The invention also relates to a sealed clutch for use in a clutch assembly of the above kind and to a clutch plate for use in a sealed clutch.

BACKGROUND OF INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Vehicle manufacturers are continuously innovating and optimising vehicle components in order develop new and improved vehicles. Amongst the components that are targeted for optimisation or re-design is the clutch assembly that connects between the vehicle engine and transmission. In particular, when manufacturers release a new vehicle, the clutch system is typically different to the outgoing model. Over the past 70 years, vehicle manufacturers have developed over 5000 different clutch configurations for different vehicles. The applicant itself stocks over 4000 different clutch kits that are used for replacement of worn or damaged clutches.

As vehicle manufacturers seek increases in engine torque output, fuel economy and improvements in noise, vibration, and harshness (NVH), the clutch assembly is often modified or re-designed. Clutch assemblies are gradually becoming more complex to be able meet vehicle performance standards. It is expected that the increased complexity in clutch assemblies will see the cost of the average clutch system increase approximately 45% from USD$171 as at 2018 to approximately USD$250 by 2025.

Existing clutch kits (kits of parts that form a clutch assembly, including a friction disc, pressure plate, diaphragm etc) are not considered to be particularly versatile and can only be applied to a very limited number of vehicles. Of the currently available clutch kits, approximately only 260 kits can fit onto more than 10 different vehicles. The lack of cross-vehicle compatibility of clutch kits provides a burden on inventory management for manufacturers and suppliers. Typical installers do not have the capacity (either in terms of space or money) to carry the enormous inventory required to be able to replaces clutches across a wide range of vehicles. Manufacturers, suppliers and installers are therefore heavily reliant on expedited freight systems to be able to promptly provide customers (the installers) with replacement kits for specific vehicles when the clutch of that vehicle requires replacement.

Repair rather than full replacement of a clutch is rarely an option given that, due to the large cost and inconvenience associated with attending an automotive workshop to deal with clutch issues, vehicle owners usually run the clutch assembly to failure before having a mechanic replace it. But this results in a significant repair activity, involving raising the vehicle on a hoist, removing various parts of the vehicle drivetrain including the clutch, ordering and thereafter installing a new clutch and replacing the remaining drivetrain parts. Moreover, it is usually necessary for the vehicle to be assessed first, to establish that the existing clutch does need to be replaced and so before a clutch kit is ordered, the vehicle usually needs to be raised on a hoist and if the decision is to replace the clutch often the vehicle will be left on the hoist while the new clutch is ordered and delivered. The vehicle thus tends to occupy valuable space and equipment in the automotive workshop (automotive workshops tend to have limited numbers of hoists) over at least two days (but often more where delivery of the new clutch is delayed or where delivery is to rural or remote locations), while the vehicle owner is inconvenienced by having the vehicle off the road for an extended period of time, often having to rent a replacement vehicle until their own vehicle is repaired. Because of this, manufacturers and suppliers have established elaborate and expensive inventory and logistic networks to expedite the delivery of clutch kit orders. The establishment of these inventory and logistic networks require significant capital expenditure in addition to ongoing running costs.

As there exists a large number of clutch kits, it is common for an installer to mistakenly order a clutch kit that is incompatible with the particular vehicle being repaired, or with the particular vehicle model. This contributes to additional supply chain expenses to the supplier, the mechanic and the customer given that the wrongly ordered clutch kit must be returned and the correct clutch kit delivered. Moreover, given the vast number of clutches currently in use, it is often the case that mechanics and suppliers encounter delays and difficulty in sourcing the correct clutch kit.

Further, as each clutch kit is to be fitted to a certain alignment and configuration, installers are required to diligently review installation specifications, and manufacturers are required to provide installers and suppliers with support through training sessions and instruction manuals. Where an installer is unable to align a clutch to the specified configuration, the life of the new clutch can be significantly compromised, and may potentially cause damage to surrounding vehicle components, i.e. the engine on one side of the clutch and the transmission on the other side.

As part of the replacement of a clutch, the flywheel attached to the crankshaft of the engine will also be assessed for wear or damage. This occurs because traditional clutches frictionally engage a surface of the flywheel for torque transmission. That flywheel surface almost always needs to be refurbished by re-grinding and so this adds to further time and expense in removing the flywheel and in sending it for grinding.

The useful life of a standard clutch is approximately 100,000 kilometres. As the average life of a vehicle is 250,000 kilometres, at least two clutch replacements are inevitable. As explained above, the process to change a clutch is labour intensive and time-consuming and can take approximately two to four days to complete. Throughout this time the vehicle owner will be without their vehicle and the automotive workshop will have the vehicle occupying garage space and resources while dormant.

For at least the forgoing reasons, the applicant has proceeded to develop new clutch assemblies with the intention to mitigate or eliminate some or all of the onerous aspects of a conventional vehicle clutch replacement. In particular, the applicant considers there to be a need for a new form of clutch assembly which can be fitted to more than one type of vehicle so that a specific form or type of clutch assembly is not required for each different vehicle or each small group of vehicles.

SUMMARY OF INVENTION

According to the present invention there is provided a sealed clutch, the sealed clutch including a spline connector for connecting the sealed clutch by splined connection to a transmission shaft of an automotive transmission, a. the spline connector comprising a connector housing and a spline ring, b. the spline ring including an opening having a spline configuration for cooperating with a splined portion of a transmission shaft, c. the connector housing being secured within the sealed clutch and the spline ring being removably connectable to the connector housing, to enable the spline ring to be removed and replaced with a different spline ring for cooperating with a splined portion of a different transmission shaft.

A sealed clutch as referred to above and throughout this specification is a clutch which does not frictionally engage the face of a flywheel. In some forms, the clutch has base plate and a pressure plate and an intermediate plate between them and the friction linings of a clutch plate are positioned on either side of the intermediate plate. In other forms, the clutch could have just a single friction lining between a base plate and a pressure plate and no intermediate plate, or it could have more than two plates, such as three of four plates (known as triple or quad clutches). The clutch plates drive a transmission shaft and the pressure plate is axially movable within the clutch to frictionally engage and disengage the clutch plates. Sealed clutches can also be modular clutches and in certain regions are also known as 'pre-assembled' clutches. In addition, clutch plates are also known as clutch discs and so the use of "plate" and "disc" in this specification is interchangeable and should be considered to be referring to the same item of a clutch.

Many of the benefits provided by the present invention occur because the clutch or friction plate of an existing clutch is required to fit a particular splined portion of a transmission shaft. However, because the sealed clutch of the present invention employs a spline connector having a removable and replaceable spline ring, if the spline ring currently fitted to the sealed clutch does not suit a particular transmission shaft, the spline ring can be removed and replaced with a different spline ring that does suit the transmission shaft. Advantageously, this allows one general form of sealed clutch to be applied to a range of vehicles that have different transmission shafts.

This has another advantage which is that the consumer is not limited to the clutch that was originally installed in the vehicle, but rather, the new clutch that is installed can be of an improved type, or at least a different type, that has not heretofore been otherwise installable in that vehicle. For example, a single disc clutch that is supplied as original equipment with a vehicle, might be replaced by a twin disc or triple disc sealed clutch for improved performance or longevity. The benefit here is that the vehicle owner has more choice than previously, because previously, the vehicle owner was limited to the particular clutch that fitted the vehicle. By use of the present invention, the vehicle owner can not only choose to replace the previous clutch with a clutch having generally the same performance and longevity, but the vehicle owner can alternatively select a different clutch for the replacement, which might be cheaper, of higher performance, or of greater longevity. The vehicle owner now has a choice that might not have been available in the past.

The present invention thus enables a reduced number of clutch kits to meet the needs of a large number of vehicles, so that a reduced number of clutch kits need to be manufactured, stored and delivered. This will have an advantageous effect in reducing costs for manufacturing (less different component parts will be needed), storage space, delivery and will reduce the amount of errors made during selection and ordering of clutch kits. Moreover, it is more likely that automotive workshops will be able to carry stock that will allow them to have suitable clutch parts on hand whereby an order and subsequent delivery of parts is not required. This would facilitate better scheduling of clutch repairs so that replacement of a clutch could take place on the day the vehicle is provided to the automotive workshop, with all the associated benefits to both the customer and the workshop. The applicant envisages supplying clutch kits with a set of 10 different spline rings to suit the 10 most popular transmission shaft configurations, so that the one sealed clutch can be used across those 10 most popular transmission shaft configurations simply by selecting the appropriate spline ring.

While the connector housing can take any suitable form, applicant has developed a connector housing that includes an opening and the spline ring is secured within the opening against rotation relative to the connector housing. The outer surface of the spline ring can be configured to cooperate with the inner surface of the opening and for example, the opening of the connector housing can be a non-round opening and the outer surface of the spline ring can have a complementary shape and be closely received within the opening, so that the spline ring is captured within the opening of the connector housing against relative rotation.

In some forms of the invention, the opening of the connector housing and the outer surface, circumference or periphery (hereinafter "outer periphery") of the spline ring are generally circular and a suitable connection arrangement is employed to connect and secure the spline ring within the opening of the connector housing. In one form of the invention, while the opening of the connector housing and the outer periphery of the spline ring are each generally circular, one of the opening and the outer periphery includes one or more radially extending projections and the other of the opening and the outer periphery includes one or more radially extending recesses, whereby the one or more projections are received within the one or more recesses when the spline ring is received within the opening of the connector housing, to locate the spline ring against rotation relative to the connector housing. A sealed clutch according to the invention thus could employ one radially extending projection and one radially extending recess, or a greater number, such as two or three sets of projections and recesses.

While the one or more radially extending projections can take any suitable form, this arrangement would be satisfied by the use of a key or keys, that each insert into aligned recesses or grooves formed in each of the opening of the connector housing and the outer periphery of the spline ring and that connects between the connector housing and the spline ring. In other forms of the invention, the one or more radially extending projections can comprise a plurality of radially extending teeth. These teeth can be spaced apart equidistantly. In this form of the invention, the teeth of the connector housing or the spline ring are received with the recesses of the spline ring or the connector housing to secure the spline ring against rotation relative to the connector housing. The teeth can be formed as or similar to gear teeth.

In the above arrangement in which the opening of the connector housing and the outer periphery of the spline ring are each generally circular, the connector housing and the spline ring will be coaxial when connected together.

In the above arrangement in which the connector housing and the spline ring are connected together by radially extending projections that extend into one or more radially extending recesses, removal of the spline ring from the connector housing can be by axial movement of the spline ring relative to the connector housing. That is, when connected, the spline ring will be secured against rotation relative to the connector housing but will not be secured against relative axial movement. Accordingly, it is necessary for the spline ring to be prevented from axial release from the connector housing when the spline ring is installed in the connector housing within a sealed clutch. For this, a removable retainer can be employed that can be removed by installation personnel when removal and replacement of the spline ring is required. A removable retainer can take any suitable form, but in some forms of the invention, the removable retainer is a circlip that seats within an annular groove formed in the opening of the connector housing and that overlies the spline ring to act as a barrier to axial egress of the spline ring from the connector housing.

The use of a circlip can prevent egress of the spline ring from the connector housing in one axial direction, or a pair of circlips can be employed on either side of the spline ring to prevent egress of the spline ring from the connector housing in each axial direction. However, if a single circlip is used the sealed clutch can be arranged to secure the spline ring against removal from the connector housing in the other axial direction by engagement with other components of the sealed clutch so that removal of the spline ring from the connector housing is in one axial direction only and once the single circlip has been removed.

A sealed clutch according to the invention can include a pair of spaced apart drive springs that provide for vibration damping. The drive springs can be straight or curved and can each comprise a single spring, or multiple springs. The drive springs can comprise coil springs or alternative springs, such as polymer springs. The drive springs can be of the kinds disclosed in applicant's previous International PCT applications published as WO2013/170288 and WO2014/194358.

Each drive spring will have opposite ends and the connector housing can be in engagement with the opposite ends so that rotation of the connector housing is operable to apply a compressive load to the drive springs, while the drive springs resist connector housing rotation and by that resistance provide vibration damping of the connector housing. The connector housing is expected to be rotatable through up to about 30-50 degrees, although the exact amount is dependent on the design of the drive springs and the degree and form of vibration damping required.

The connector housing can have any suitable configuration to engage the opposite ends of the drive springs and in one form, the connector housing comprises a connector body in which the opening for receipt of the spline ring is provided and the connector housing has abutments or projections extending from the connector body into engagement with the opposite ends of the drive springs.

A sealed clutch according to the invention will have a central axis about which the clutch rotates in use, and in some forms of the invention, the drive springs are located symmetrically on opposite sides of the central axis and are spaced apart equidistantly about the central axis. There will often be two drive springs (comprising single or multiple springs as discussed above), but the invention contemplates a greater number of drive springs such as three of four drive springs. Where two drive springs are provided, the connector housing can have a pair of abutments extending from opposite sides of the connector body and into engagement with the opposite ends of the drive springs. A single abutment can extend into engagement with the opposite ends of two drive springs. The engagement may not be permanent but may occur when the connector housing rotates sufficiently to engage the end of a drive spring, but permanent connection between the connector housing and the drive springs assists to prevent rattling within the sealed clutch. The abutment thus needs to extend between or bridge between the two opposite ends of two drive springs. Alternatively, the connector housing can have a separate abutment for engaging each end of the drive springs. Where three drive springs are provided, the connector housing can have three spaced apart abutments extending from the connector body, with each abutment extending into engagement with the opposite ends of two drive springs, or the connector housing can have six abutments with each abutment extending into engagement with one drive spring end.

The abutments can have tapered side walls for engaging the ends of the drive springs substantially normal or square to the axis of the drive springs at the ends of the drive springs.

In some forms of the invention, a sealed clutch will include a clutch plate that has a pair of drive plates that define an internal cavity between them. The drive plates can each have a coaxially aligned opening through which the splined portion of a transmission shaft can extend. The spline connector of the sealed clutch is housed within the cavity and the opening of the spline ring is coaxial with the openings of the drive plates. The spline connector is rotatable relative to the drive plates against the bias of the drive springs for applying a compressive load to drive springs that are mounted to the drive plates. The drive springs can be mounted fully or partially within the internal cavity between the drive plates.

The spline ring can be removable through one of the drive plates or through both of the drive plates. In some forms of the invention, removal of the spline ring is through one drive plate only and in these forms of the invention, the outer diameter of the spline ring can be slightly less than the inner diameter of the opening of the drive plate through which the spline ring is removable. To prevent the spline ring from release from the connector housing through the drive plate, the removable retainer discussed above (a circlip for example) can be included in the opening of the connector housing to retain the spline ring connected to the connector housing against axial release. Other forms of removable retainer can alternatively be employed, such as removable grub screws, or a ring similar to a circlip but which screws into the opening of the connector housing. In this form of the invention, removal of the removable retainer enables removal of the spline ring from the spline connector through the opening of the drive plate.

In a more specific form of the invention, the pair of drive plates comprises first and second drive plates and a first axial end of the connector housing is rotationally seated against a facing surface of the first drive plate that extends about the opening of the first drive plate and a second and opposite axial end of the connector housing is rotationally seated against a surface of the second drive plate that extends about the opening of the second drive plate.

The sealed clutch can include one or more biasing springs to apply a load to the movable components within the internal cavity between the drive plates in order to resist rattling between the components. In some forms of the invention, the sealed clutch can include at least two wave or spring washers between the axial ends of the connector housing and the drive plates to apply opposing loads to the movable components within the internal cavity between the drive plates for resistance to rattling. Where wave or spring washers are employed between the axial ends of the connector housing and the drive plates along with the circlip retainer discussed above, the circlip can be positioned between the spline ring and a wave or spring washer and the circlip can be removable through the wave or spring washer and through the drive plate for subsequent removal of the spline ring.

The wave or spring washers can interact with a washer holder or locator (hereinafter "washer holder") that assists to secure the wave or spring washers in place. For example, a wave or spring washer can have an inner opening defined by an inner edge and the inner edge can have one or more recesses and likewise, the opening of the second and adjacent drive plate is defined by an inner edge and that inner edge can have one or more recesses in alignment with the one or more recesses of the inner opening of the wave or spring washer. A washer holder can be interposed between the wave or spring washer and the second axial end of the connector housing and the washer holder can include one or more projections which extend into the one or more recesses of the wave or spring washer and the opening of the second drive plate to locate both the washer holder and the wave or spring washer against rotation relative to the second drive plate. The recesses can be grooves or slots or the like. The washer holder can be free to rotate relative to the second axial end of the connector housing.

A wave or spring washer can also be interposed between the first axial end of the connector housing and the facing surface of the first drive plate, and a washer holder or locator (hereinafter "washer holder") can be interposed between the wave or spring washer and the first axial end of the connector housing. The washer holder can assist to locate the connector housing in coaxial relationship with the opening of the first drive plate and can transfer biasing load from the wave or spring washer to the spline ring to maintain the spline ring within the connector housing and, where a circlip retainer is employed as discussed above, the washer holder can transfer biasing load from the wave or spring washer to the spline ring to maintain the spline ring in connection with, such as pressing against, the circlip.

The washer holder interposed between the first axial end of the connector housing and the facing surface of the first drive plate can include projections that extend into engagement with the connector housing and which fix the washer holder against rotation relative to the connector housing. Thus, the connector housing, the spline ring and the washer holder are located against rotation relative to one another. The washer holder can be free to rotate relative to the wave or spring washer.

The washer holder can be formed as a ring and the projections can extend axially toward the second drive plate and a circular lip can extend axially toward the first drive plate. The outer diameter of the lip can be a close fit within the inside diameter of the opening of the first drive plate to locate the washer holder relative to the first drive plate.

The washer holder in the above embodiment can also constitute a spacer to space the spline connector from an adjacent drive plate. The spacer can vary in axial depth to accommodate clutch plates that have different numbers of friction linings. Thus, a clutch plate that has a pair of friction linings (a twin clutch plate) has a different axial depth or thickness compared to clutch plates that have triple or quad friction linings. With triple or quad clutch plates, the spline connector will be positioned further from the adjacent drive plate and so a spacer of greater axial depth than that used in a twin clutch plate is required. Three separate spacers can be provided for separate use with twin, triple and quad clutch plates. The spacers can be plastic parts. This enables them to have a heat insulating capacity as well.

Each of the washer holders can be plastic to insulate against the build-up of heat when the spline ring and the connector housing rotate relative drive plates, while the different material of the washer holders positioned between the metal wave or spring washers and the metal spline connector can reduce wear within the sealed clutch.

BRIEF DESCRIPTION OF DRAWINGS

In order that the invention may be more fully understood, some embodiments will now be described with reference to the figures in which.

DETAILED DESCRIPTION

Figure 1:
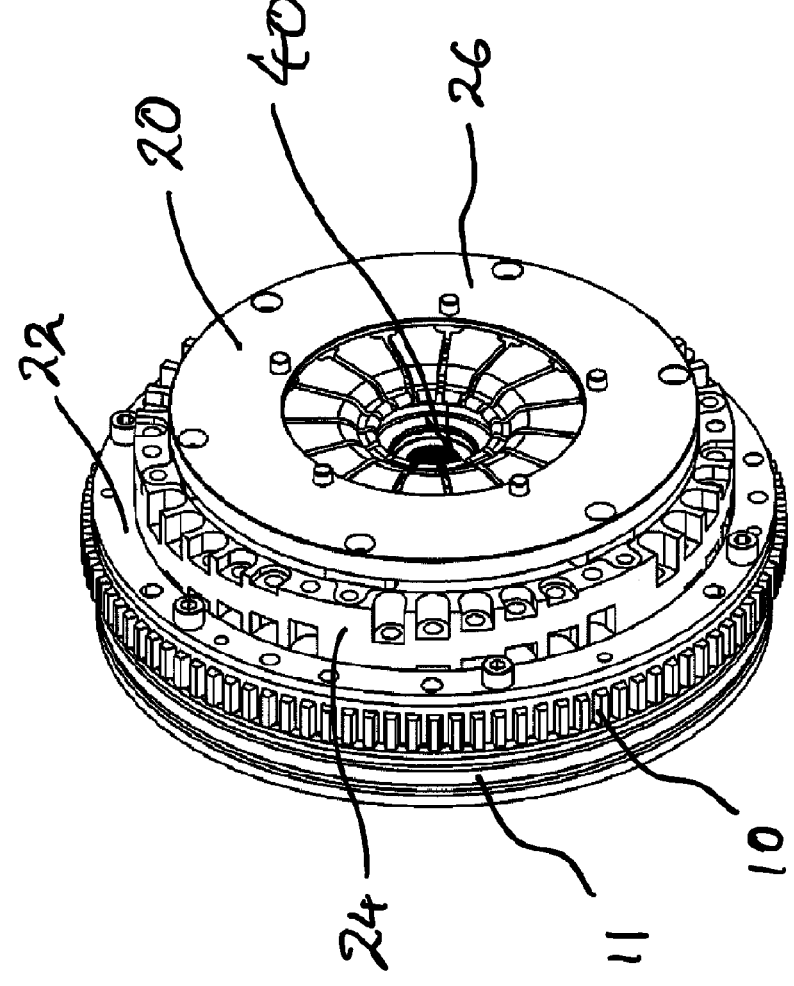
FIG. 1 is a perspective view of a sealed clutch and flywheel assembly according to the present invention.

FIG. 1 is a perspective view of a flywheel 10 to which a clutch assembly 20 is connected. The flywheel 10 includes an outer ring 11 within which the majority of the weight of the flywheel 10 is concentrated. The flywheel 10 connects to the crank shaft of an engine, while the clutch assembly 20 connects to the transmission shaft of an automotive transmission. The clutch assembly 20 is of the kind that is described in two co-pending patent applications that the present applicant has filed simultaneously with the present application. The content of the specifications of Australian Provisional patent applications 2020902618 and 2020902619 is to be considered to be incorporated into this specification by this reference.

FIG. 1 shows that the clutch assembly 20 includes a connection ring 22 in connection with the flywheel 10, a spacer 24 and a sealed clutch 26. The clutch assembly 20 does not connect to the flywheel 10 and it thus varies from traditional clutch installations, in which the clutch would connect directly to and frictionally engage with the flywheel. In the present invention, the sealed clutch 26 connects to the flywheel either directly via the spacer 24, or via a combination of the spacer 24 and the connection ring 22 as shown in FIG. 1.

Figure 2:
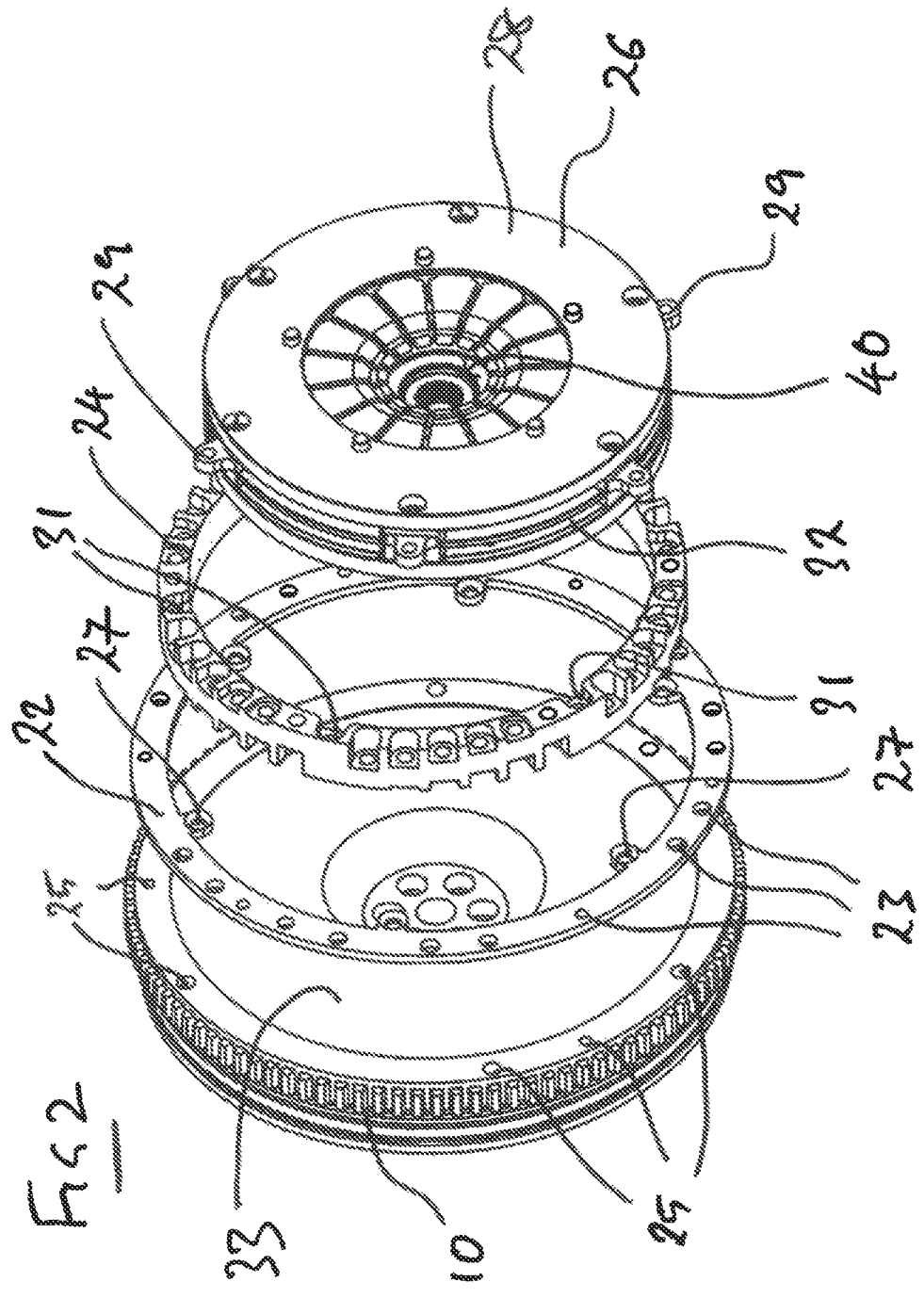
FIG. 2 is an exploded view of the sealed clutch and flywheel assembly of FIG. 1.

FIG. 2 is an exploded view of the flywheel 10 and the clutch assembly 20 of FIG. 1 and shows that the connection ring 22 includes openings 23 through which fasteners can extend for connection with openings 25 in the flywheel 10. The spacer 24 connects to the connection ring 22 by lugs 27 that are received and fixed within recesses in the spacer 24. The sealed clutch 26 of FIG. 3 attaches to the spacer 24 via lugs 29 that are received and fixed within recesses 31 in the spacer 24. In a traditional clutch installation, the clutch would connect directly to the flywheel and would frictionally engage the flywheel surface 33 when the clutch was engaged. In the illustrated arrangement, the sealed clutch 26 is spaced from the surface 33 and so there is no engagement with that surface when the clutch is engaged.

Figure 3:
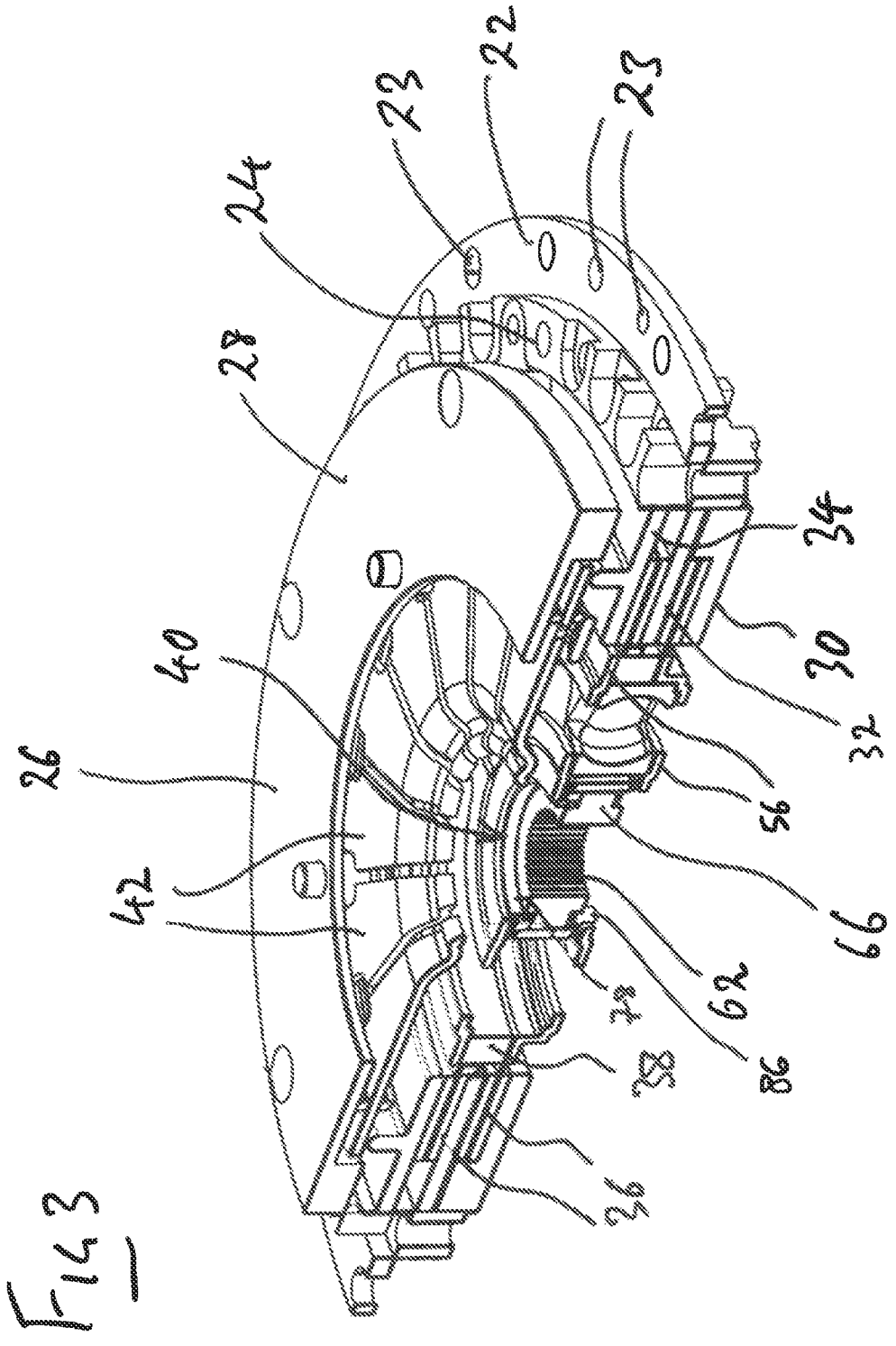
FIG. 3 is a cross-sectional view of the sealed clutch of FIG. 1.

The sealed clutch 26 is shown in cross-sectional view in FIG. 3. FIG. 3 also shows the connection ring 22 and the spacer 24 in cross-section. In relation to the sealed clutch 26, this comprises a top plate 28, a base plate 30, an intermediate or friction plate 32 and a pressure plate 34. Friction linings 36 are attached to the periphery of a clutch plate which is generally marked 38 and are located between the base plate 30 and the intermediate plate 32, and between the intermediate plate 32 and the pressure plate 34. The clutch plate 38 extends to a centre hub 40. The centre hub 40 is, in use, in splined connection with the splined end of a transmission shaft (not shown) that extends to the transmission of the vehicle. As previously explained herein, different transmissions have differently configured transmission shafts including differently configured spline connections with which the centre hub 40 is required to engage. The present invention provides a removable spline connector so that the sealed clutch 26 can engage and thus be suitable for use with a variety of differently configured transmission shafts.

The general operation of the sealed clutch 26 would be evident to a person skilled in the art, but briefly, the clutch assembly 20 connects to the flywheel 10 on one side (via the connection ring 22 and the spacer 24), and to the transmission shaft on the other side (via the centre hub 40). In the state shown in FIG. 3, the friction linings 36 are in firm frictional engagement with (or are sandwiched between) the pressure plate 34, the intermediate plate 32 and the base plate 30, so that torque delivered from the flywheel 10 to the clutch 26, rotates the clutch plate 38 which drives rotation of the centre hub 40 and the connected transmission shaft to drive the transmission of the vehicle. To disengage the clutch 26, pressure is applied to the diaphragm springs 42 at a radial inward portion of the springs 42, which allows the pressure plate 34 to lift slightly and thus to frictionally disengage the friction linings 36 of the clutch plate 38 so that the clutch plate 38 no longer drives the centre hub 40 and the transmission shaft connected to the hub 40, so that the transmission of the vehicle is no longer driven.

Thus, rotation of the clutch plate 38 is as a result of frictional engagement within the clutch 26 and, in contrast with traditional clutches, no frictional contact with the flywheel 10 is required. Because of this, the arrangement of the invention has major benefits, in that the requirement to refurbish the friction surface of the flywheel or to replace the entire flywheel is no longer necessary, or is no longer as frequent as with traditional clutches.

The present invention is directed to a form of sealed clutch which includes a spline connector that can be configured for cooperating with differently configured spline connections of different automotive transmission shafts so that the one sealed clutch can connect to more than one form of transmission shaft. The centre hub 40 shown in FIGS. 2 and 3 includes a spline connector according to the present invention and which is shown in more detail in the figures that follow.

Figure 4:
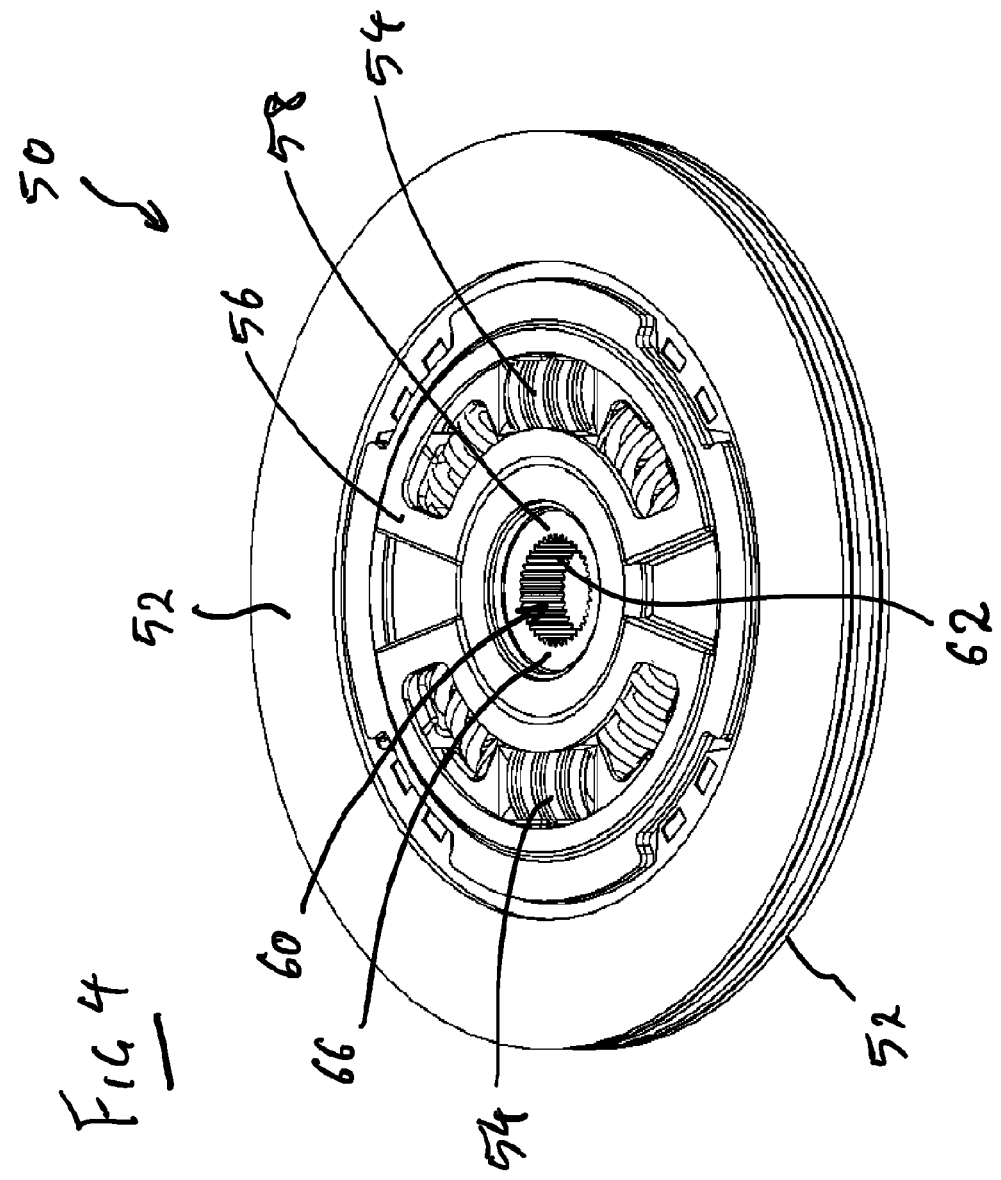
FIG. 4 is perspective view of the clutch plate of the sealed clutch of FIG. 1.

FIG. 4 illustrates a clutch plate 50 according to the invention, that can be employed in a sealed clutch such as the sealed clutch 26 of FIGS. 2 and 3. The clutch plate 50 can thus be installed in a sealed clutch 26 to assume the position of the clutch plate 38 of FIG. 3. The clutch plate 50 includes friction linings 52, drive springs 54 and upper and lower drive plates 56 within which the drive springs 54 are mounted (only the upper drive plate is visible in FIG. 4, but a similar drive plate is positioned below the drive plate that is visible in FIG. 4) and a spline connector 58. FIG. 4 only shows the spline connector 58 from above and in an assembled form but shows that the spline connector 58 has a central circular opening 60 that has an internal splined wall 62 for engaging with the splined portion of a transmission shaft.

The drive plates 56 connect together and define an internal cavity between them. The friction linings 52 connect or attach to the periphery of the drive plates 56, while the spline connector 58 is housed within the cavity.

Figure 5:
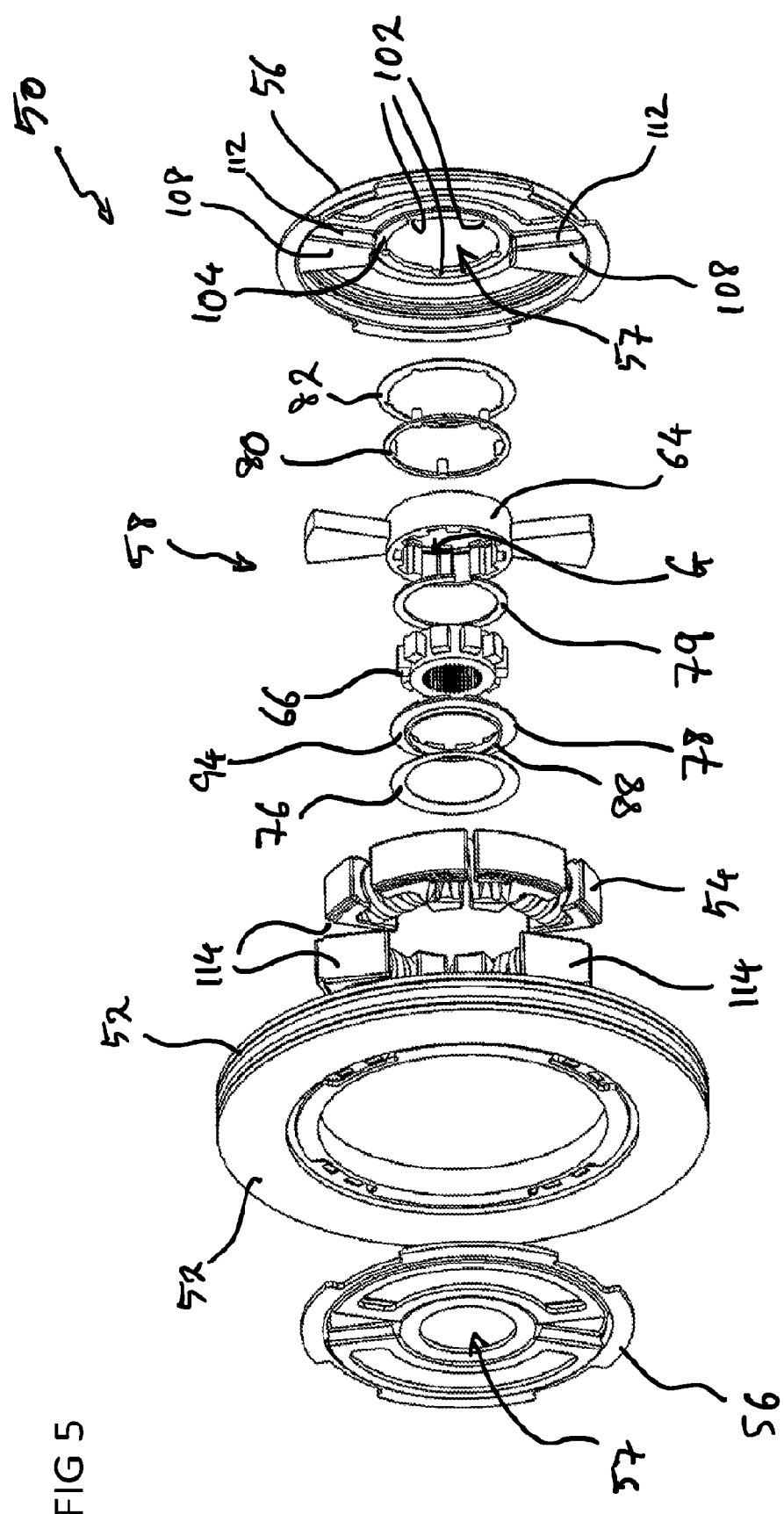
FIG. 5 is an exploded perspective view of the clutch plate of the sealed clutch of FIG. 4.

FIG. 5 illustrates the clutch plate 50 of FIG. 4 in exploded view. FIG. 5 shows the spline connector 58 in more detail (but reference numeral 58 does not appear in FIG. 4) and from FIG. 5 it can be seen that the spline connector 58 comprises a connector housing 64 and a spline ring 66. The connector housing 64 and spline ring 66 are shown respectively separately and connected in FIGS. 6A, 6B and 6C.

The connector housing 64 has a generally circular opening 68 (FIG. 6A) which includes a plurality of equidistantly spaced projections 70 that project radially inwardly of the opening 68 and that have slightly inclined side walls. The spline ring 66 has a generally circular periphery which includes a plurality of equidistantly spaced projections 74 extending radially outwardly therefrom. Between the projections 70 of the connector housing 64 are recesses 72 and the projections 70 and recesses 72 are configured for receipt of the projections 74 of the spline ring 66, with the projections 74 of the spline ring 66 being received within the recesses 72 of the connector housing 64.

Figures 6A, 6B, 6C:
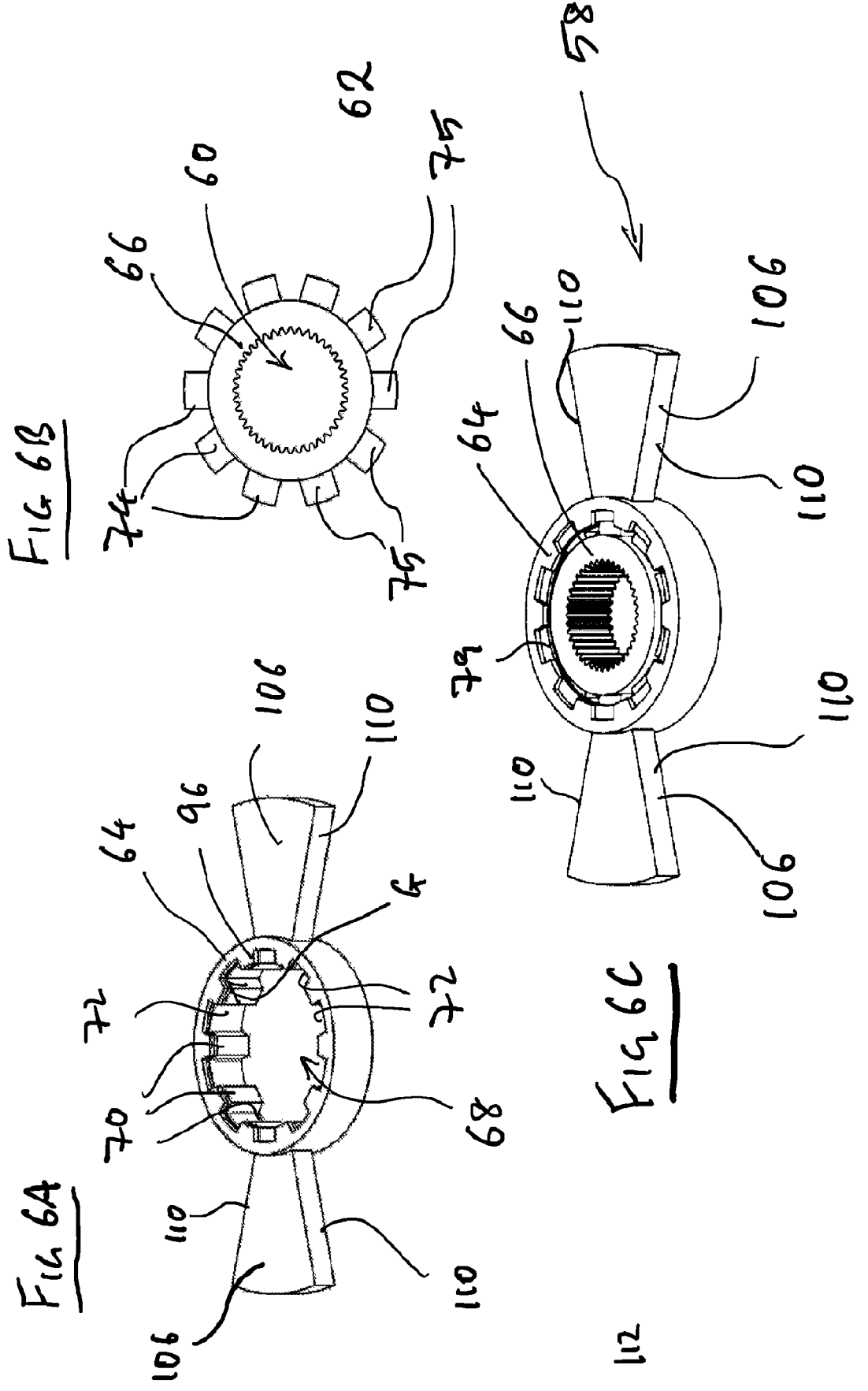
FIGS. 6A, 6B and 6C are views of a connector housing, a spline ring and a combination connector housing and spline ring respectively.

FIG. 6C shows the connector housing 64 and the spline ring 66 in connection and by the interconnection between the projections 74 and recesses 72, the connector housing 64 and the spline ring 66 are connected together against relative rotation about the coaxial axes of the respective openings 60 and 68. However, in the arrangement illustrated, the spline ring 66 is not located axially (along the axis of the openings 60 and 68) with respect to the connector housing 64. That is, in absence of axial location, the spline ring 66 can pass through the connector housing 64. However, in the assembled clutch plate 50, the spline ring 66 is captured in the connector housing 64 against axial movement as hereinafter described.

Figure 7:
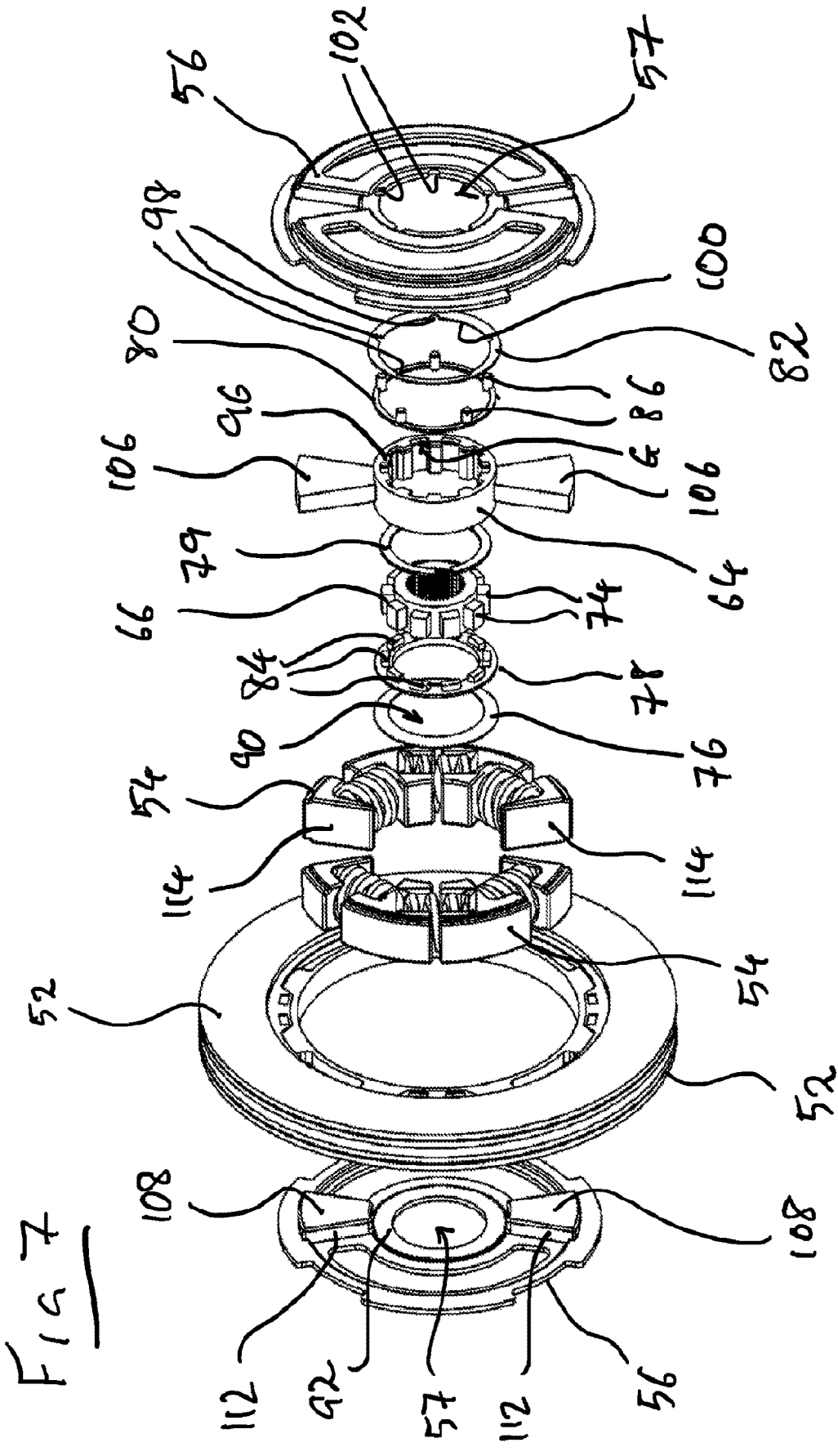
FIG. 7 is an exploded perspective view of the clutch plate of the sealed clutch of FIG. 4 taken from the opposite perspective to FIG. 5.

FIG. 7 is a further exploded view of the clutch plate 50, taken from the opposite perspective of FIG. 5.

The connector housing 64 of the spline connector 58 has opposite axial ends which face respective drive plates 56. Interposed between the respective opposite axial ends are rings 76, 78, 80 and 82. Also shown is a circlip 79. FIG. 7 is taken from an angle which shows that the rings 78 and 80 include projections for a purpose that is described hereinafter.

The rings 76 and 82 are wave or spring washers that apply load between the spline connector 58 and the drive plates 56 in order to resist rattling between the components but to still allow smooth rotation of the spline connector 58 relative to the drive plates 56. The ring 78 is a spacer and the ring 80 is a washer holder.

The spacer 78 includes a plurality of axially extending projections 84, while the washer holder 80 also includes axially extending projections 86. The projections 84 of the spacer 78 extend into the recesses 72 of the connector housing 64. These are the same recesses 72 that the projections 74 of the spline ring 66 extend into, but as shown in FIG. 7, the projections 74 have an axial length which is less than the full axial length of the spline ring 66, so that the recesses 72 can axially accommodate both the projections 84 and the projections 74. Receipt of the projections 84 within the bottom ends of the recesses 72 fixes the spacer 78 against rotation relative to the connector housing 64.

As shown in FIG. 5, the spacer 78 further includes an axially extending circular lip 88 that is received through the opening 90 of the wave or spring washer 76 with the outer diameter of the lip 88 being a close fit within the inner diameter of the opening 90 to coaxially align the rings 76 and 78. The wave or spring washer 76 seats against the surface 92 of the drive plate 56 and against the facing surface 94 (see FIG. 5) of the spacer 78.

On the opposite side of the connector housing 64, the washer holder 80 seats against the facing surface 96 of the connector housing 64 and the projections 86 extend axially through the indents or recesses 98 formed in the inside wall 100 of the wave or spring washer 82 so that the respective rings 80 and 82 are fixed against relative movement. The projections 86 further extend into the recesses 102 (see FIGS. 5 and 7) of the drive plate 56 thus further locating the rings 80 and 82 against rotation relative to the drive plate 56. The wave or spring washer 82 seats against the surface 104 (see FIG. 5) of the drive plate 56.

The rings 78 and 80 are plastic in the embodiment illustrated. The spacer or ring 78 rotates with the spline ring 66 and the connector housing 64 and relative to the wave or spring washer 76. The plastic spacer 78 insulates against the build up of heat when the spline ring 66 and the connector housing 64 rotate relative to the wave or spring washer 76 and the different material of the spacer 78 relative to the metal wave or spring washer 76 and the metal spline ring 66 and the connector housing 64 reduces wear.

The spacer 78 can vary in axial depth or thickness to accommodate clutch plates that have different numbers of friction linings. A pair of friction linings 52 is shown in FIGS. 5 and 7, but triple and quad friction lining clutch plates can alternatively be employed and these have a greater axial depth than the pair of friction linings 52 shown in FIGS. 5 and 7. In order to use the same form of spline ring 66 and connector housing 64 as shown in the figures, spacers of different axial depth can be employed so that the selected spacer can extend through the greater axial depth of the triple and quad friction lining clutch plates to engage with the connector housing 64. In this respect, the connector housing 64 and the spline ring 66 can remain the same size regardless of whether they are paired with the double friction lining clutch plate 50, or with triple and quad friction lining clutch plates. Three separate spacers 78 can be provided for separate use with twin, triple and quad friction lining clutch plates. The spacers can vary by the axial thickness of the ring from which the projections 84 extend varying in thickness. Because the spacer 78 is a plastic part, it is relatively cheap and easy to provide in the three different forms.

The circlip 79 forms a removable retainer that provides an axial barrier against egress of the spline ring 66 from the connector housing 64. The circlip 79 is received within a groove G (see FIGS. 5, 6A and 7) formed through the projections 70 and the recesses 72 of the connector housing 64. The circlip 79 thus overlies one axial side of the spline ring 66, in particular overlying the projections 74 of the spline ring 66. The circlip 79 can be contracted radially to release from the groove G and can then be removed through the rings 80 and 82 and then through the opening 57 of the adjacent drive plate 56. Once removed, the barrier against removal of the spline ring 66 from the connector housing 64 is no longer in place and so the spline ring 66 can also be removed through the rings 80 and 82 and then through the opening 57 of the adjacent drive plate 56 and replaced with a different spline ring as suitable for the particular transmission shaft to which the spline connector 58 is to be connected. Once the new spline ring has been inserted, the circlip 79 can be reinstalled into the groove G and the new spline is then secured within the connector housing 64.

The spline ring 66 cannot be removed through the rings 76 and 78. The rings 76 and 78 overlie the projections 74 of the spline ring 66, so that the openings of the rings 76 and 78 are not large enough for the spline ring 66 to fit through. This can be seen in FIG. 4 in which the projections 74 of the spline ring 66 are not visible. In contrast, in FIG. 8, the projections 74 of the spline ring 66 are visible and so in absence of the circlip 79 (not visible in FIG. 8), the spline ring 66 is free to be removed from within the clutch plate 50 without either of the rings 80 and 82 being removed.

In the assembled state of the clutch plate 50, the openings 57 of the drive plates 56 and the openings 60 and 68 of the connector housing 64 and the spline ring 66 are coaxially aligned to allow the splined portion of a transmission shaft to extend therethrough. Moreover, as explained above, the spline connector 58 is mounted to be rotatable relative to the drive plates 56, so that the spline connector 58 can apply a compressive load to the drive springs 54 for the purpose of vibration damping. For this, the connector housing 64 includes radial extensions 106. The extensions 106 are positioned between similar shaped formations 108 of the drive plates 56 when the drive plates 56 are assembled together to form the cavity that houses the spline connector 58.

In a resting state of the clutch plate 50 side surfaces 110, 112 of the extensions 106 and the formations 108 are engaged by abutting surfaces 114 of the drive springs 54 (see FIGS. 5 and 7). By that engagement, the connector housing 64 and thus the spline connector 58 is located against rotation relative to the drive plates 56. However, to dampen vibrational loads, the connector housing 64 of the spline connector 58 will rotate, rotating the radial extensions 106 against the bias of the drive springs 54. The drive springs 54 will compress with one of the abutting surfaces 114 of each of the drive springs 54 disengaging from a facing side surface 112 of the formations 108 as it is driven away from side surface 112 to compress by a respective extension 106.

The radial extensions 106 are mounted in slightly axially spaced relationship with facing surfaces of the formations 108 and rotate relative to the formations 108 with the relative rotation being in the order of up to about 30-50 degrees.

Figure 8:
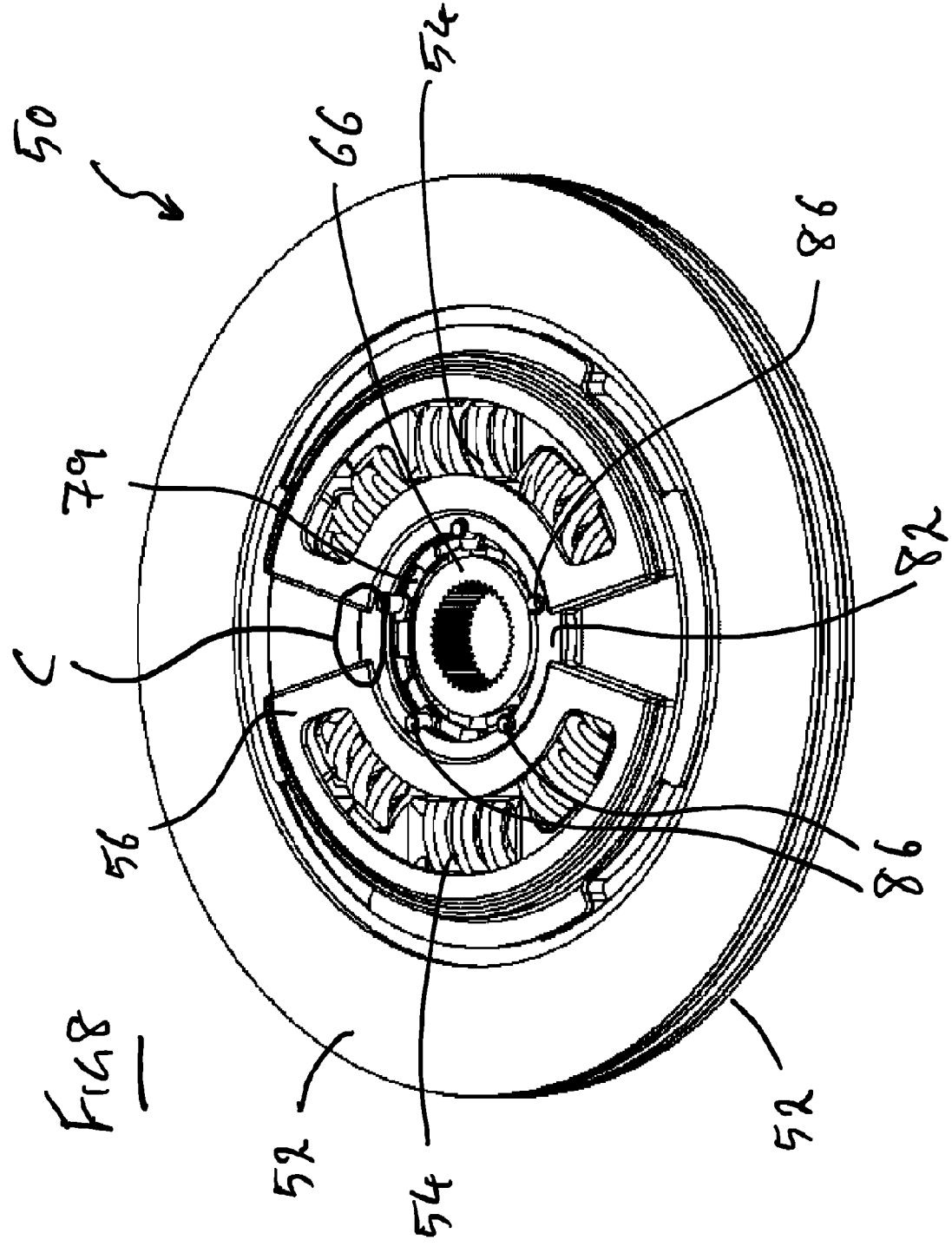
FIG. 8 is perspective view of the clutch plate of the sealed clutch of FIG. 1 taken from the opposite perspective to FIG. 4.

FIG. 8 is a view of the clutch plate 50 from the side of the ring 82 (the opposite side of FIG. 4) and from this figure, it can be seen that the ring 82 is captured at its outer diameter beneath the inner diameter of the drive plate 56 about the opening 57—see the circled region marked C in FIG. 8. In other words, the inner diameter of the opening 57 of the drive plate 56 overlies a portion of the ring 82 so that the ring 82 cannot be removed when it assumes its normal or operational condition as shown in FIG. 8. Thus, the ring 82 and the ring 80 are held in place by the drive plate 56. The circlip 79 is shown in FIG. 8 within the groove G and overlying the projections 74 of the spline ring 66 (the projections 74 are obscured by the circlip 79). The circlip 79 can be accessed with the rings 80 and 82 in place and through the opening 57 of the drive plate 56 and once the circlip 79 is removed, the spline ring 66 can also be removed and replaced. This is because the outer diameter of the spline ring 66 is less than the inner diameter of the openings in each of the rings 80 and 82 and the inner diameter of the opening 57 of the drive plate 56.

The clutch plate 50 of FIG. 8 is installed in a sealed clutch 26 and the sealed clutch 26 is installed in a clutch assembly 20, as shown in FIG. 1. Conveniently, the spline ring 66 is accessible in the assembled clutch assembly 20 and can be used or removed and replaced as necessary to receive the splined portion or end of a transmission shaft.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A sealed clutch including a spline connector for connecting the sealed clutch by splined connection to a transmission shaft of an automotive transmission, the sealed clutch being free from frictional engagement with a surface of a flywheel attached to a crankshaft of an engine, the spline connector comprising a connector housing and a spline ring removably coupled to the connector housing, the spline ring including an opening having a spline configuration for cooperating with a splined portion of the transmission shaft, the connector housing being secured within the sealed clutch and including an opening having a spline configuration, the spline ring being insertable into the opening of the connector housing and having a splined outer surface for cooperation with the spline configuration of the connector housing opening, splined cooperation between the connector housing and the spline ring securing the spline ring within the connector housing opening against rotation relative to the connector housing and facilitating removable connection of the spline ring with the connector housing, the spline ring being secured in the connector housing against removal from the connector housing in one axial direction by a removable circlip and in the opposite axial direction by engagement with a ring, the removable circlip and the ring engaging opposite sides of the splines of the splined outer surface, the removal of the removable circlip allowing the removal of the spline ring from the connector housing, the sealed clutch including a pair of spaced apart drive springs and each drive spring having opposite ends and the connector housing being in engagement with the opposite ends so that rotation of the connector housing in a first direction of rotation is operable to apply a compressive load to the drive springs.

2. The sealed clutch according to claim 1, the opening of the connector housing being configured to cooperate with the splined outer surface of the spline ring to locate the spline ring against rotation relative to the connector housing.

3. The sealed clutch according to claim 2, the opening of the connector housing being a non-round opening and the splined outer surface of the spline ring having a complementary shape and being closely received within the opening.

4. The sealed clutch according to claim 2, the opening of the connector housing being generally circular and the spline ring having a generally circular outer periphery and being closely received within the opening of the connector housing and the spline ring being connected within the opening of the connector housing by a connection arrangement.

5. The sealed clutch according to claim 1, the opening of the connector housing and the outer periphery of the spline ring each being generally circular the opening including one or more radially extending recesses, whereby the splines of the splined outer surface are received within the one or more recesses when the spline ring is received within the opening of the connector housing, to locate the spline ring against rotation relative to the connector housing.

6. The sealed clutch according to claim 1, the connector housing comprising a connector body in which the opening for receipt of the spline ring is provided and the connector housing having abutments extending from the connector body into engagement with the opposite ends of the drive springs.

7. The sealed clutch according to claim 6, sealed clutch having a central axis and the drive springs being located symmetrically on opposite sides of the central axis and being spaced apart equidistantly about the central axis, the connector housing having a pair of abutments extending from opposite sides of the connector body into engagement with the opposite ends of the drive springs.

8. The sealed clutch according to claim 7, the drive springs being curved springs and the pair of abutments having tapered side walls for engaging the opposite ends of the drive springs substantially normal to the axis of the ends of the drive springs.

9. The sealed clutch according to claim 1, wherein the sealed clutch is connected to a spacer that provides spacing of the sealed clutch from the surface of the flywheel.

10. A sealed clutch including a spline connector for connecting the sealed clutch by splined connection to a transmission shaft of an automotive transmission, the sealed clutch being free from frictional engagement with a surface of a flywheel attached to a crankshaft of an engine, the spline connector comprising a connector housing and a spline ring removably coupled to the connector housing, the spline ring including an opening having a spline configuration for cooperating with a splined portion of the transmission shaft, the connector housing being secured within the sealed clutch and including an opening having a spline configuration, the spline ring being insertable into the opening of the connector housing and having a splined outer surface for cooperation with the spline configuration of the connector housing opening, splined cooperation between the connector housing and the spline ring securing the spline ring within the connector housing opening against rotation relative to the connector housing and facilitating removable connection of the spline ring with the connector housing, the spline ring being secured in the connector housing against removal from the connector housing in one axial direction by a removable circlip and in the opposite axial direction by engagement with a ring, the removable circlip and the ring engaging opposite sides of the splines of the splined outer surface, the removal of the removable circlip allowing the removal of the spline ring from the connector housing, the sealed clutch including a clutch plate having a pair of drive plates that define an internal cavity between them and the spline connector being housed within the cavity, the drive plates each having a coaxially aligned opening through which the splined portion of the transmission shaft can extend and the opening of the spline ring being coaxial with the openings of the drive plates, the spline connector being rotatable relative to the drive plates and the spline ring being removable through the opening of one of the drive plates.

11. The sealed clutch according to claim 10, the outer diameter of the spline ring being slightly less than the inner diameter of the opening of the drive plate through which the spline ring is removable, and the removable circlip being provided to retain the spline ring connected to the connector housing, whereby removal of the removable circlip enables removal of the spline ring from the spline connector through the opening of the drive plate.

12. The sealed clutch according to claim 10, the connector housing having a first axial end and a second axial end opposite the first axial end, the first axial end rotationally seated against a facing surface of a first drive plate of the pair of drive plates that extends about the opening of the first drive plate and the second axial end rotationally seated against a surface of a second drive plate of the pair of drive plates that extends about the opening of the second drive plate with one or more rings interpositioned between the respective first and second axial ends of the connector housing and the respective facing surfaces of the first and second drive plates.

13. The sealed clutch according to claim 12, the one or more rings comprising a wave or spring washer positioned between the first axial end of the connector housing and a facing surface of the first of the drive plates to apply a biasing load between the connector housing and the facing surface of the first drive plate.

14. The sealed clutch according to claim 13, having a locator formed as a ring being interposed between the wave or spring washer and the first axial end of the connector housing, the locator including projections that extend axially toward the second drive plate and that extend into engagement with the connector housing and which fix the locator against rotation relative to the connector housing, and a circular lip extending axially away from the second drive plate and the outer diameter of the lip being a close fit within the inside diameter of the opening of the first drive plate.

15. The sealed clutch according to claim 12, including a wave or spring washer positioned between the second axial end of the connector housing and a facing surface of the second of the drive plates to apply a biasing load between the connector housing and the facing surface of the second drive plate.

* * * * *